US009043918B2

(12) United States Patent
Bhattacharjee et al.

(10) Patent No.: US 9,043,918 B2
(45) Date of Patent: May 26, 2015

(54) SYSTEM AND METHOD FOR PROFILE BASED FILTERING OF OUTGOING INFORMATION IN A MOBILE ENVIRONMENT

(75) Inventors: Rajbir Bhattacharjee, New Delhi (IN); Balbir Singh, Haryana (IN)

(73) Assignee: McAfee, Inc., Santa Clara, CA (US)

( * ) Notice: Subject to any disclaimer, the term of this patent is extended or adjusted under 35 U.S.C. 154(b) by 366 days.

(21) Appl. No.: 13/273,073

(22) Filed: Oct. 13, 2011

(65) Prior Publication Data

US 2013/0097652 A1   Apr. 18, 2013

(51) Int. Cl.
   *H04L 29/06*   (2006.01)
   *H04W 12/02*   (2009.01)
   *G06F 21/53*   (2013.01)
   *G06F 21/55*   (2013.01)
   *G06F 21/56*   (2013.01)
   *H04W 12/08*   (2009.01)
   *G06F 21/62*   (2013.01)

(52) U.S. Cl.
   CPC ........... *H04L 63/0227* (2013.01); *H04W 12/02* (2013.01); *G06F 21/53* (2013.01); *G06F 21/554* (2013.01); *G06F 21/566* (2013.01); *H04W 12/08* (2013.01); *G06F 21/6245* (2013.01); *G06F 21/6281* (2013.01)

(58) Field of Classification Search
   CPC ............ H04L 63/0227; G06F 21/6245; G06F 21/6281; G06F 21/53; G06F 21/554; G06F 21/566; H04W 12/08; H04W 12/02
   USPC .................................................... 726/22–25
   See application file for complete search history.

(56) References Cited

U.S. PATENT DOCUMENTS

| 5,987,610 A | 11/1999 | Franczek et al. |
| 6,073,142 A | 6/2000 | Geiger et al. |

(Continued)

FOREIGN PATENT DOCUMENTS

| KR | 10-2011-0110254 A | 10/2011 |
| WO | WO 2010/056552 A2 | 5/2010 |
| WO | WO 2013/055500 A1 | 4/2013 |

OTHER PUBLICATIONS

TaintDroid: An Information-Flow Tracking System for Realtime Privacy Monitoring on Smartphones, 9th USENIX Symposium on Operating Systems Design and Implementation, Vancouver, Canada, Oct. 4-6, 2010, 15 pages.

(Continued)

*Primary Examiner* — Jeffrey D Popham
(74) *Attorney, Agent, or Firm* — Patent Capital Group (57) ABSTRACT

A system and method in one embodiment includes modules for detecting an access request by an application to access information in a mobile device, determining that the application is a potential threat according to at least one policy filter, and blocking a send request by the application to send the information from the mobile device without a user's consent. More specific embodiments include user selecting the information through a selection menu on a graphical user interface that includes information categories pre-populated by an operating system of the mobile device, and keywords that can be input by the user. Other embodiments include queuing the send request in a queue with other requests, and presenting an outbox comprising the queue to the user to choose to consent to the requests. The outbox includes graphical elements configured to permit the user to selectively consent to any requests in the queue.

13 Claims, 3 Drawing Sheets

(56) References Cited

U.S. PATENT DOCUMENTS

| | | |
|---|---|---|
| 6,460,050 B1 | 10/2002 | Pace et al. |
| 7,506,155 B1 | 3/2009 | Stewart et al. |
| 2008/0313080 A1* | 12/2008 | Vasa et al. .................... 705/44 |
| 2009/0144823 A1 | 6/2009 | Lamastra et al. |
| 2010/0064341 A1 | 3/2010 | Aldera |
| 2010/0077445 A1 | 3/2010 | Schneider et al. |
| 2012/0317638 A1* | 12/2012 | Carrara et al. ................ 726/17 |
| 2013/0067531 A1* | 3/2013 | Morris et al. .................. 726/1 |

OTHER PUBLICATIONS

International Search Report and Written Opinion, International Application No. PCT/US2012/055671, mailed Feb. 14, 2013, 10 pages.

International Preliminary Report on Patentability in International Application No. PCT/US2012/055671, mailed Apr. 15, 2014, 6 pages.

* cited by examiner

SYSTEM AND METHOD FOR PROFILE BASED FILTERING OF OUTGOING INFORMATION IN A MOBILE ENVIRONMENT

TECHNICAL FIELD

This disclosure relates in general to the field of computer networks and communication and, more particularly, to a system and method for profile based filtering of outgoing information in a mobile environment.

BACKGROUND

The field of computer network security has become increasingly important and complicated in today's society. Computer network environments are configured for virtually every enterprise or organization, typically with multiple interconnected computers (e.g., end user computers, laptops, servers, printing devices, etc.). In many such enterprises, Information Technology (IT) administrators may be tasked with maintenance and control of the network environment, including executable software files (e.g., web application files) on hosts, servers, and other network computers. As the number of executable software files in a network environment increases, the ability to control, maintain, and remediate these files efficiently can become more difficult.

Moreover, hackers are targeting computer networks and users' sensitive information through mobile devices. Hackers' appetites for the mobile channel are rising, with one third of smartphone users now accessing the Internet from their mobile devices. Mobile devices are among the fastest growing consumer technology, and a variety of mobile applications are popular in the mobile channel. As mobile devices have grown in popularity, so have hackers' interests in these devices. Mobile malware, for example, is on the rise, as attackers target mobile phones. Yet, the balance of innovation versus security in the mobile space is being challenged by the industry's desire to attract more developers. Providing open access to application development can drive developer attention and open the door for technology abuse at the same time. Competition among mobile platforms is high, putting pressure on shorting content approval cycles and simplifying pre-launch security checks to boost developer time-to-market. The trend of mobile user concentration, opening device platforms and shortened security procedures raises security threats to computer networks and users' privacy from vulnerabilities in mobile devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A system and method in an example embodiment include modules for detecting an access request by an application to access information in a mobile device, determining that the application is a potential threat according to one or more policy filters, and blocking a send request by the application to send the information from the mobile device without a user's consent. The method may also include flagging the application and filtering substantially all outgoing data for the information.

In another example embodiment, the method includes the user selecting the information through a selection menu on a graphical user interface that includes information categories pre-populated by an operating system of the mobile device, and keywords that can be input by the user. The information selected by the user can be incorporated into the policy filters.

In yet another example embodiment, the method includes queuing the send request in a queue with other requests, and presenting an outbox comprising the queue to the user to choose to consent to the send request and the other requests. The outbox is presented to the user on a graphical user interface, and includes graphical elements configured to permit the user to selectively consent to any requests in the queue and other features.

Example Embodiments

Figure 1:
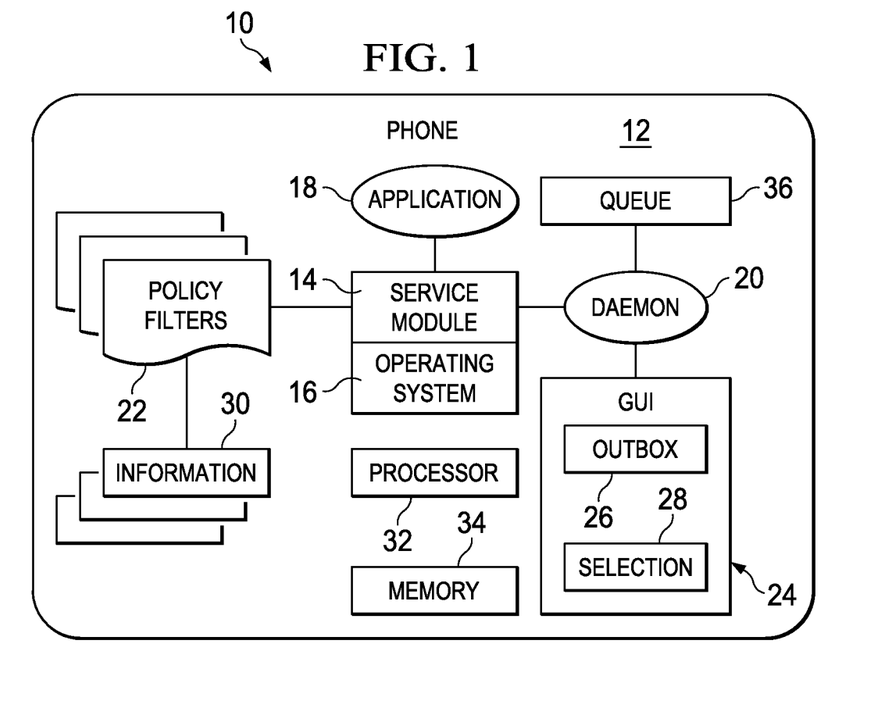
FIG. 1 is a simplified block diagram illustrating components of a system for profile based filtering of outgoing information according to an example embodiment.

FIG. 1 is a simplified block diagram illustrating an example implementation of a system 10 for profile based filtering of outgoing information. A mobile device 12 may be provisioned with a service module 14 on an operating system 16. Mobile devices, such as mobile device 12, are inclusive of mobile phones, smart mobile phones (smartphones), e-book readers, tablets, iPads, personal digital assistants (PDAs), laptops, electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges. Service module 14 may communicate with one or more applications 18 (referred to herein in the singular as application 18 to refer to one of the applications). An application includes application software that runs on (or is capable of running on) mobile devices and performs specific tasks for the mobile device's user. Applications may include native applications pre-installed on the mobile device, such as address books, calendars, calculators, games, maps and Web browsers. Applications may also be downloaded from various mobile application software distribution platforms such as Google® Android Market, Apple® App Store, Palm® Software Store and App Catalog, RIM® App World, etc.

Service module 14 may communicate with a daemon 20 and access or control one or more policy filters 22. As used herein, the term "daemon" encompasses a computer program and/or process that generally runs outside the direct control of the user, including background processes. As used herein, the term "policy filter" includes filters that describe information 30 (e.g., one set of policy filters 22 may describe information to be monitored that is selected by the user on a particular date, and another set of policy filters 22 may describe information that is selected by the user on another date, etc.).

A graphical user interface (GUI) 24 may communicate with daemon 20. GUI 24 may include an outbox 26 and a selection menu 28. As used herein, the term "graphical user interface" includes an interface that allows the user to interact with mobile device 12 using graphical elements (e.g., images, graphical icons, visual indicators, etc.) rather than text commands. In general, the user's interactions are usually performed through manipulation of the graphical elements. The graphical elements may be generally displayed on a display device, such as a screen, of mobile device 12.

Applications 18 may request access (referred to herein as "access request") to information 30. An access request includes any attempt by any process in the mobile device, including an application (or any associated loaded modules), kernel module, network service, etc. to read or write to data in the mobile device (e.g., information 30). Although FIG. 1 shows only application 18, any process in mobile device 12 may attempt access within the broad scope of the present disclosure. Information 30 includes any information that can be stored, accessed and sent over a communication network, including information related to location, contact lists, personally identifiable information (PIN), phone number, international mobile equipment identity (IMEI) number, phone call history, international mobile subscriber identity (IMSI) number, bank account numbers, credit/debit card numbers, personal passwords, emails, camera pictures, web history, data, device statistics, text messages, audio keywords, etc. Mobile device 12 may be equipped with a processor 32 and memory 34. All or part of information 30 may reside in memory 34 or other storage device within mobile device 12 or may be located in a device external to mobile device 12, for example, in a computer connected to a network and communicable with mobile device 12. In example embodiments, the user may select information 30 using selection menu 28.

Components of system 10 may implement a policy based filtering of information 30. Once information 30 is identified (e.g., user selects information 30), policy filters 22 may be activated that filter substantially all outgoing data for information 30. As used herein, the term "outgoing data" includes all data sent out (or being sent out, or queued for sending out) of mobile device 12 by any ports, network interfaces, short message service (SMS), http methods, voice calls, raw sockets, near field communication techniques, Infrared, Bluetooth or any other means of communicating data. Data, as used herein in this specification, refers to any type of numeric, voice, video, graphic, or script data, or any type of source or object code, or any other suitable information in any appropriate format that may be communicated from one point to another in electronic devices and/or networks. Once the filtering is done, a user can distinguish a legitimate access to information 30 from an illegitimate access.

For purposes of illustrating the techniques of system 10, it is important to understand the activities and security concerns that may be present in a given system such as the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Some applications may be specifically designed to be malicious, and some other applications may be easily exploited for malicious purposes. Downloadable and native applications can present potential threats on mobile devices. As used herein, "threats" include applications that fall into one or more of the following categories: (1) malware; (2) spyware; (3) privacy threat; and (4) vulnerable applications. Accordingly, a "potential threat" is an application that exhibits suspicious behavior (e.g., reading sensitive information 30) but has not been identified as a threat or verified as not being a threat. Malware is software that is designed to engage in malicious and/or unwanted behavior on a device. For example, malware can commonly perform actions without a user's knowledge, such as making charges to the user's phone bill, sending unsolicited messages to the user's contact list, or giving an attacker remote control over the device. Malware can also be used to steal personal information from a mobile device that could result in identity theft or financial fraud.

Spyware is software that is designed to collect or use data without a user's knowledge or approval. For example, spyware may automatically trigger a camera's phone or microphone, record conversations, record locations, etc. and send the collected information to a remote recipient. Privacy threats may be caused by applications that may not be necessarily malicious, but gather or use information (e.g., location, contact lists, personally identifiable information) that is unnecessary to perform their primary functions.

Vulnerable applications can contain software vulnerabilities that can be exploited for malicious purposes. For example, vulnerabilities can often allow an attacker to access sensitive information, perform undesirable actions, stop a service from functioning correctly, automatically download malicious software, or otherwise engage in undesirable behavior.

Typically, hackers can use the vulnerabilities in mobile devices to access information on the mobile devices and on devices in a connected network, such as computer networks, and send the accessed information to remote locations surreptitiously. For example, mobile phone technologies, such as Android operating system (OS), provide a rich application programming framework, which allows application developers to get access to a variety of data like SMS's, phone logs, contact lists, web browsing history, etc. in the mobile devices if they have relevant permissions. Many users naively allow permission to any and all applications, thereby compromising security. Hackers can use the permissions to access personal and/or secured information.

Generally, applications explicitly request the user for permission (typically during installation) to access sensitive information. However, a user who is not technologically savvy may not understand how these permissions are used by the applications. Even if the user is technologically savvy, s/he may not understand how and when the permissions are used through the life time of the application. Moreover, some applications may require permissions for advertising (location/Internet access) to perform their primary function; however, without adequate controls, the information may be sent to unauthorized recipients as well. It may be hard to differentiate legitimate permissions from illegitimate ones. Applications may not immediately behave maliciously upon installation; sensitive information (e.g., SMS's with financial information, IMEI number, IMSI number, phone numbers, etc.) may be sent out many days after the application is installed without the user noticing information that is being leaked.

Potential threats are typically dependent on operating systems, and may affect some operating systems more than others. For example, some malware and spyware target devices operating on an Android OS. An Android OS tries to provide a level of protection by asking the user to validate certain permissions like SMS receive/send internet access, etc. However, this information is not sufficient for the user to make a deterministic decision on the threat the application poses.

One solution currently available for the Android OS provides a taint tracking and analysis system capable of simultaneously tracking multiple sources of sensitive data. The solution provides real time analysis by leveraging Android OS's virtualized execution environment. The solution modifies the Android OS's application verification platform to track the flow of privacy-sensitive information by automatically labeling data from privacy-sensitive sources. When labeled data is transmitted over the network, or otherwise leaves the mobile device, the solution logs the data's labels, the application responsible for transmitting the data, and the data's destination. However, the solution does not prevent the applications from sending the sensitive data. Moreover, users may be disturbed as they are informed any time the data has been sent. The solution may also add a significant overhead. Typical mobile devices can not tolerate the platform changes required and overheads of the solution. A system for profile based filtering of outgoing information outlined by FIG. 1 can resolve these issues, among others. Embodiments of the present disclosure seek to vastly improve capabilities of existing technologies to allow for a more robust solution. In example embodiments, components of system 10 may detect an access request to access information 30 by application 18 in mobile device 12, determine that application 18 is a potential threat according to one or more policy filters 22, and block application 18 from sending information 30 from mobile device 12 without the user's consent.

In an example embodiment, a user may select information 30 using selection menu 28. Service module 14 may incorporate the user's selection into policy filters 22. For example, service module 14 may create new policy filters, or update existing policy filters based on the user's selection. A malicious application 18 may request access to information 30 (e.g., a phone number and IMEI number of mobile device 12), for example, to send information 30 via SMS to an unauthorized recipient. Service module 14 may intercept the access request to information 30, and invoke policy filters 22. Policy filters 22 may mark application 18 as a potential threat and service module 14 (and/or policy filters 22) may flag application 18, for example, using any known method. As used herein, the term "flagging" includes marking applications for attention or treatment in a certain way. For example, application 18 may be flagged as a "threat" and substantially all requests by application 18 that are associated with information 30 may be redirected to daemon 20 for further processing.

In one example, application 18 reads information 30 even though it is flagged. However, if application 18 requests to send information 30 from mobile device 12, for example, via a wireless interface, then the send request may be intercepted by service module 14. The send request may be blocked waiting for user intervention for final action. Daemon 20 may place the send request in queue 36 along with other requests (e.g., access requests such as read requests and write requests, other send requests, etc.) that are waiting for user intervention.

In this example, daemon 20 may present queue 36 to the user via outbox 26. The user can approve or deny the requests at a later point in time, for example, so that the user is not disturbed to provide user intervention every time a request associated with information 30 (such as an access request, send request, etc.) occurs. Thus, at any time (immediately or any desired time later), the user can approve or deny the send requests for outgoing information.

Approving/denying options can be configured appropriately to allow the user various choices for controlling information access and distribution. In one example, application 18 may be prevented from sending information 30 out of mobile device 12 by the user. In another example, the user can decide to allow a one time access to information 30 or permanently allow/disallow application 18 from either reading/writing or sending information 30. In yet another example, the user can also decide to monitor application 18 after allowing access. In monitor mode, a report may be generated for the user to see at a later time.

Service module 14 may reside as privileged code in system 10. Marking code as "privileged" enables the code to temporarily enable access to more resources than are available to the unprivileged code that called it. For example, application 18 may not be allowed direct access to information 30, but service module 14, to perform its functions, may access information 30 on behalf of the user. In various embodiments, service module 14 may be implemented as one or more of: (i) a kernel module; (ii) modified existing system services, or new system services; or (iii) modified existing libraries, or new libraries. Various other implementations are also possible within the broad teachings of the present disclosure.

According to example embodiments, daemon 20 may comprise unprivileged code that communicates with service module 14, and may facilitate showing alerts, options to change policy filters 22, etc. Daemon 20 may queue information 30 in queue 36, and present outbox 26 (e.g., comprising queue 36) to the user to choose to consent to sending information 30 from mobile device 12. Queue 36 may include send requests, access requests, and any other request associated with information 30. In an example embodiment, daemon 20 may run in the background and may be initiated by service module 14. In another embodiment, daemon 20 may begin running automatically when mobile device 12 is turned on. In yet another embodiment, daemon 20 may be activated into action when application 18 attempts to read information 30.

Mobile device 12 may include more or less components than shown in FIG. 1. The components shown, however, are sufficient to disclose an illustrative embodiment of the present disclosure. For example, mobile device 12 may include a touch sensitive display, on which the user can select graphical elements (e.g., boxes) on selection menu 28 and outbox 26. In another example embodiment, mobile device 12 may include a number of GUIs, including GUI 24. For example, mobile device 12 may include a top level GUI that includes icons or other graphical elements representing various GUIs, including GUI 24. The user can select GUI 24 by selecting its representative icon. In various implementations, GUI 24 may be provisioned with graphical elements (e.g., icons) representing outbox 26 and selection menu 28. The user may select outbox 26, for example, by touching its representative icon. When the user selects outbox 26, queue 36 may be appropriately displayed. On the other hand, when the user selects selection menu 28, the appropriate graphical elements associated therewith may be displayed. In yet other embodiments, mobile device 12 may be provisioned with other methods of input/output (e.g., voice input/output) to facilitate user interactions with mobile device 12.

Mobile device 12 may include additional components (not shown), such as input/output (I/O) devices, and/or sensor devices. For example, a speaker and a microphone may be included in mobile device 12. GUI 24 may be configured to facilitate voice-enabled functionalities. Mobile device 12 may be configured to place and receive telephone calls (e.g., using Voice over IP (VoIP) protocols), send and receive e-mail messages (e.g., using POP3 protocol), and retrieve electronic documents and/or streams, such as web pages, photographs, and videos over a communication network. In some embodiments, mobile device 12 may implement multiple device functionalities such as, for example, a telephony device, an e-mail device, a network data communication device, a Wi-Fi base station device, a media processing device, a Bluetooth device, etc. In some implementations, mobile device 12 can implement network distribution functionality. For example, the functionality can enable the user to take mobile device 12 while traveling and provide access to its associated network (e.g., mobile device 12 can extend Internet access such as Bluetooth and Wi-Fi to other wireless devices in the vicinity. As such, mobile device 12 can grant or deny access to other wireless devices.

In some implementations, various ports may be provided on mobile device 12 to facilitate communication with various other devices that are capable of receiving and/or transmitting data. For example, a Universal Serial Bus (USB) port, or a docking port, or some other wired port connection may be included. The ports may enable mobile device 12 to communicate using one or more protocols, such as transmission control protocol/Internet protocol (TCP/IP), hyper text transfer protocol (HTTP), user datagram protocol/IP (UDP/IP), and other protocols where appropriate and based on particular needs. Mobile device 12 may connect to networks and to remote nodes (e.g., other mobile devices) through wireless links such as High Speed Packet Access (HSPA), 3G, Global System for Mobile Communication (GSM), WiFi, WiMax, Ultra Wide Band (UWB), Bluetooth, Long Term Evolution-Advanced (LTE-A), and any other wireless technology developed in the future. Ports and/or network interfaces that enable wired and wireless communication by mobile device 12 can be included to facilitate sending "outgoing data" as described in this Specification.

Policy filters 22 may be created, maintained and enforced on mobile device 12. Policy filters 22 may also be created at a central station, such as a server station, for example, using a policy editor program. The created policy filters 22 may be pushed to the central station as appropriate and based on suitable needs, wherein policy filters 22 may be updated periodically and transferred back to mobile device 12. In various embodiments, policy filters 22 may comprise a policy file data structure stored in an extensible markup language (XML) format. For example, the policy file data structure may specify an element identifier field (e.g., to identify outgoing means, application requests, etc.).

Figure 2:
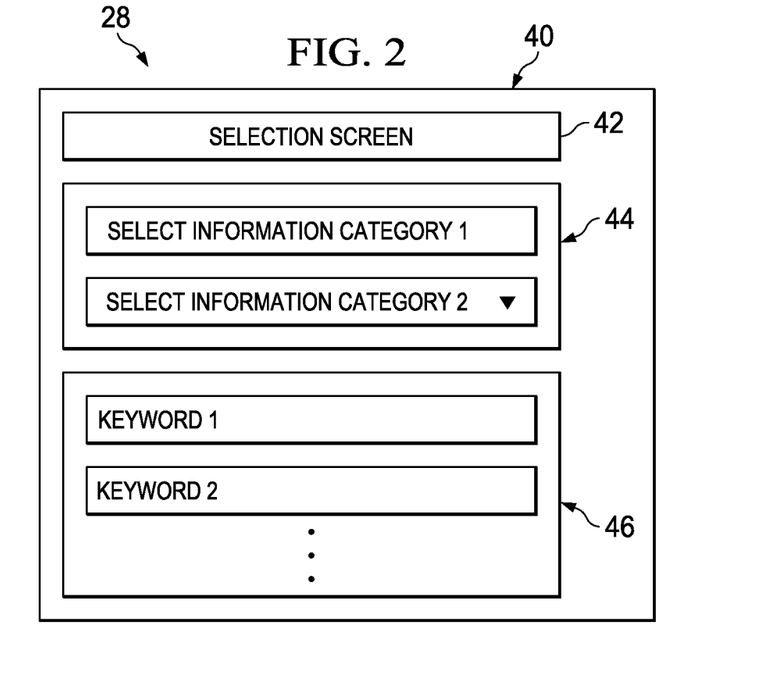
FIG. 2 is a simplified block diagram illustrating additional details of the system according to an example embodiment.

Turning to FIG. 2, FIG. 2 is a simplified block diagram illustrating additional details of the system according to an example embodiment. Selection menu 28 includes a screen 40. Selection menu 28 provides the user with options to select information 30. The selection may be pre-populated, or user defined, or any suitable combination thereof. In an example embodiment, a selection screen title 42 may be viewed on a top section of screen 40. A drop down menu 44 may present a user with pre-populated options of various information categories of information 30. For example, drop-down menu 44 may include: IMEI number, phone number, IMSI number, contacts, web history, etc. The pre-populated options may depend on the operating system of mobile device 12. In example embodiments, Android OS may present one set of pre-populated options, and Apple OS may present another set of pre-populated options.

Screen 40 may include a section 46 for inputting (e.g., typing, speaking, etc.) entries, such as keywords, selected text, patterns, and/or natural language instructions. Keywords or selected text such as "bank account" or "PIN" etc. may be typed into section 46 by the user. The user may also type in appropriate patterns (e.g., "bank account and PIN" or "userid and password", etc.), or natural language instructions (e.g., "block userid followed by password," etc.) into section 46.

Any other arrangement and design of selection menu 28 may be implemented without changing the broad scope of the present disclosure.

Figure 3:
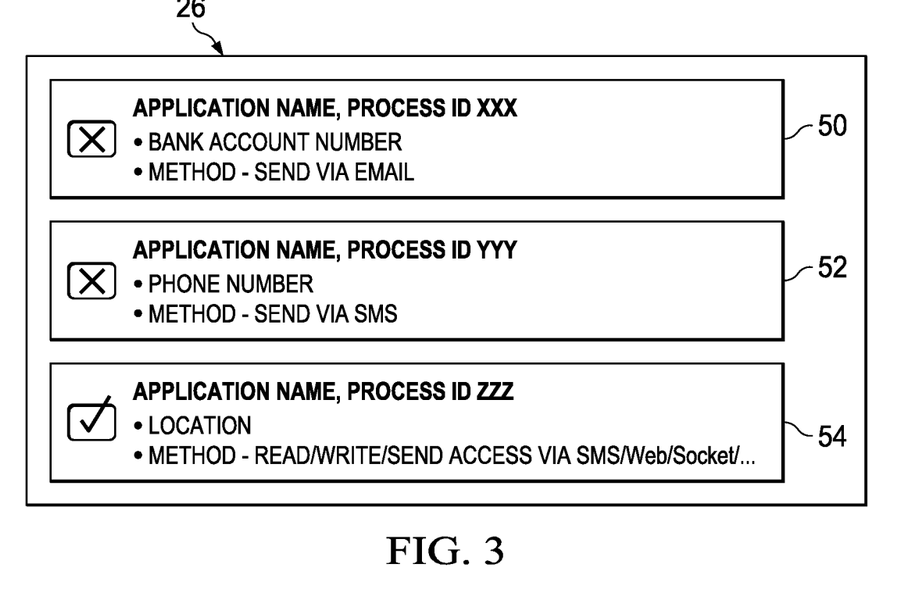
FIG. 3 is a simplified block diagram illustrating an example detail of the system according to an embodiment of the present disclosure.

Turning to FIG. 3, FIG. 3 is a simplified block diagram illustrating an example detail of the system according to an embodiment of the present disclosure. Outbox 26 may be presented to the user on GUI 24, and may comprise graphical elements (e.g., boxes, icons, etc.) configured to permit the user to selectively consent to any requests in queue 36 and deny consent to other requests in queue 36. In an example embodiment, the user can simultaneously consent to some requests and deny the other requests, for example, by selecting the requests to allow and clicking on an "enter" button or icon. Service module 14 may compile the allowed requests and permit them to be executed simultaneously or otherwise, as determined by the operating system. In another embodiment, the user can consent to requests one at a time on GUI 24. As the user selects the request, the request may be automatically allowed to execute by service module 14 and/or the operating system.

According to an example embodiment, the requests in queue 36 may be presented as shown in FIG. 3. Outbox 26 may include a list of applications 18 flagged for consent and queued for sending in queue 36. A process identifier (process ID) may be displayed to uniquely identify the executing instance of the application. For example, box 50 may present an application 18 that sought to send a bank account information via email. Box 52 may present another application 18 that sought to send a phone number via SMS. Box 54 may present yet another application 18 that sought to send a location information to a medical service provider.

In an example embodiment, at every read request by application 18, policy filters 22 may be invoked. If any of the filters matches information 30 sought to be accessed, application 18 may be flagged. If a blocked application tries to send any data, sending of the data is blocked and put into queue 36. In an example embodiment, any data sent by application 18 that has been flagged may be blocked. In another example embodiment, the data of a flagged application is blocked if the data contains information 30. The process of blocking can be automated or manual.

As each application seeks to access information 30 (e.g., using access requests) and send it from mobile device 12 (e.g., using send requests), daemon 20 may collect the send requests (and/or other requests, such as access requests) and queue them in queue 36. Daemon 20 may facilitate presenting queue 36 to the user via outbox 26. The user may select one or more (or none) of the queued list in queue 36 and approve or deny the send request. In an example embodiment, outbox 26 may be configured to deny all requests of applications 18 by default and the user can selectively consent to one or more (or none) of the requests. In yet another embodiment, outbox 26 may be configured to permit all requests of applications 18 by default and the user can selectively withdraw consent from one or more (or none) of the requests. In the example shown in FIG. 3, the user has approved application 18 presented in box 54 and denied the others.

Figure 4:
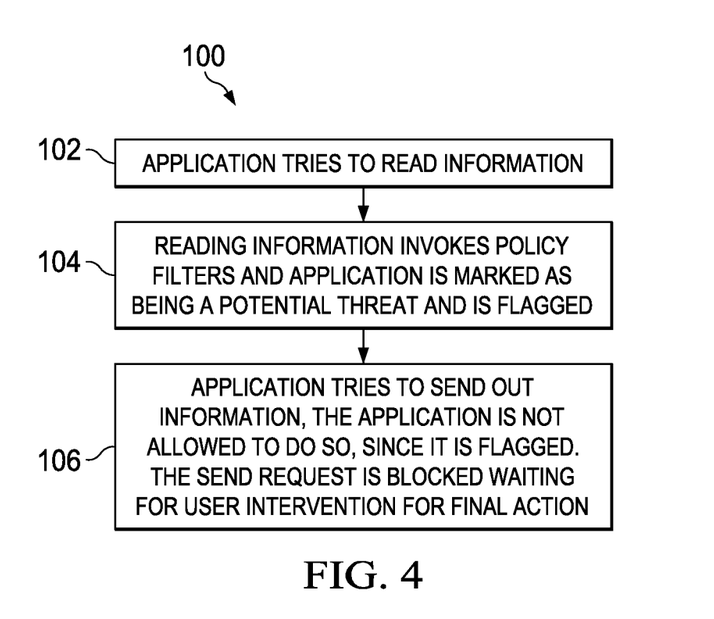
FIG. 4 is a simplified flow-chart illustrating example operational steps that may be associated with embodiments of the present disclosure.

Turning to FIG. 4, FIG. 4 is a simplified flow-chart illustrating example operational steps for a particular scenario that may be associated with embodiments of the present disclosure. Operations 100 may include 102 wherein application 18 tries to send information 30. In 104, application 18 reading information 30 may invoke one or more policy filters 22 by service module 14. Service module 14 may flag application 18 as a potential threat. In 106, when application 18 tries to send information 30, application 18 may not be allowed to do so, since it is flagged. The send request is blocked waiting for user intervention for a final action. If the user approves the send request on outbox 26, information 30 is sent out of mobile device 12. Otherwise, the send request may be denied.

Figure 5:
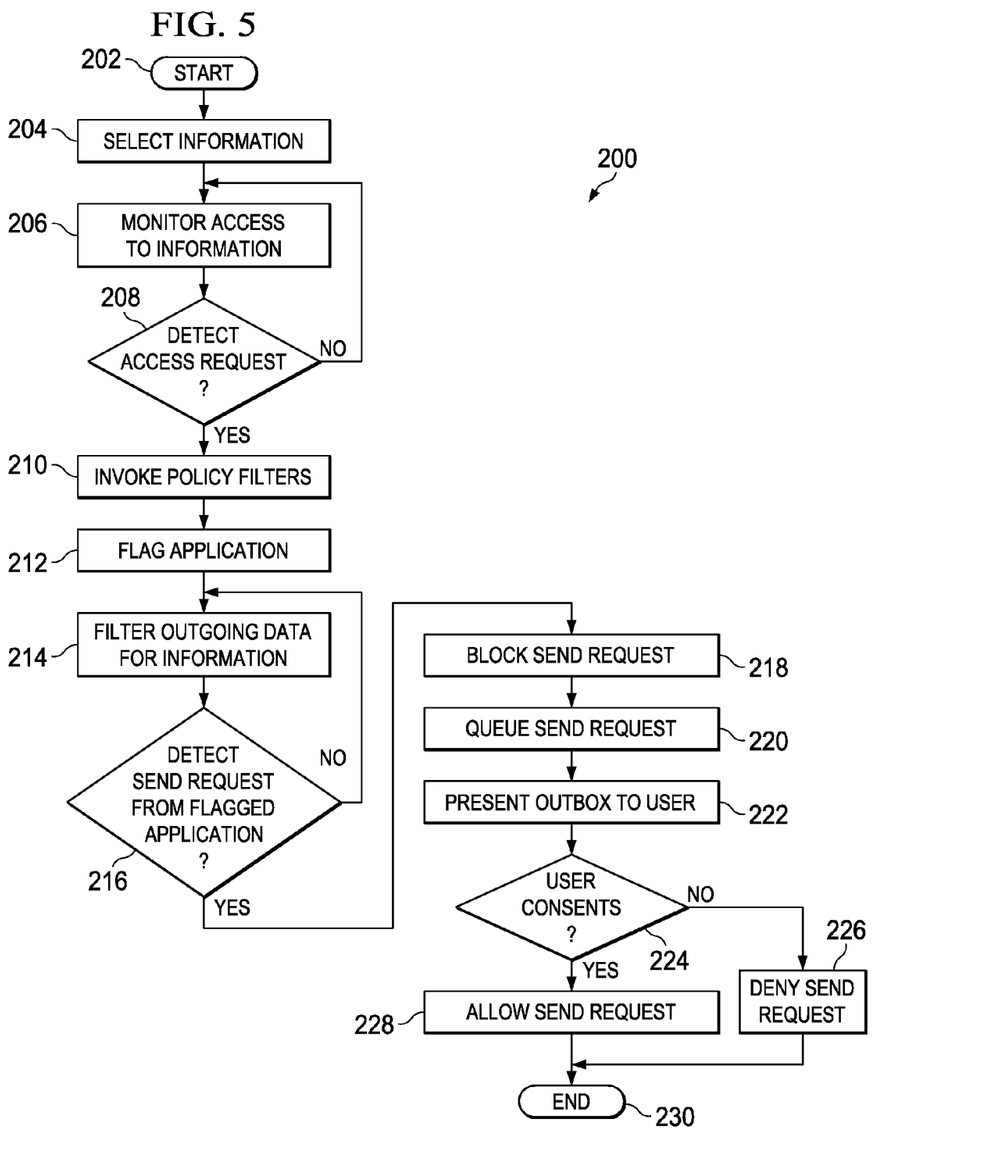
FIG. 5 is a simplified flow-chart illustrating example operational steps that may be associated with embodiments of the present disclosure.

Turning to FIG. 5, FIG. 5 is a simplified flow-chart illustrating example operational steps that may be associated with embodiments of the present disclosure. Operations 200 may begin in 202, when service module 14 and/or daemon 20 is activated. In 204, daemon 20 presents selection menu 28 to the user to select information 30. In 206, service module 14 monitors access by any application (e.g., application 20) to information 30. In 208, service module 14 determines if an access request is detected. If no access request is detected, monitoring may be continued in 206. Otherwise, if an access request is detected (e.g., access request by application 20), policy filters 22 may be invoked in 210. Service module 14 may flag application 20 as a potential threat in 212.

Policy filters 22 may filter substantially all outgoing data for information 30 in 214. If any send request (e.g., to send information 30) from flagged application 20 is detected in 216, the send request may be blocked in 218. The send request may be queued in 220 in queue 36. Outbox 28 comprising the send request (including other requests in queue 36) may be presented to the user in 222. In an example embodiment, read requests, write requests and other send requests may be presented to the user. If the user does not consent in 226, the send request is denied in 226. If the user consents in 224, the send request is allowed in 228, and the operations end in 230.

Although the embodiments described herein have referred to mobile applications, it will be apparent that other sets of program files may be evaluated and/or remediated using system 10. The options for profile based filtering of outgoing information as shown in FIGURES, are for example purposes only. It will be appreciated that numerous other options, at least some of which are detailed herein in this Specification, may be provided in any combination with or exclusive of the options of the various FIGURES.

Software for profile based filtering of outgoing information can be provided at various locations (e.g., within service module 14). In one example implementation, this software is resident in a mobile device sought to be protected from a security attack (or protected from unwanted, or unauthorized manipulations of a writeable memory area). In a more detailed configuration, this software is specifically resident in a security layer of an operating system, which may include (or otherwise interface with) the components depicted by FIG. 1. In still other embodiments, software could be received or downloaded from a web server (e.g., in the context of purchasing individual end-user licenses for separate devices, applications, etc.) in order to provide this security protection.

In other examples, the functions described herein could involve a proprietary element (e.g., as part of an antivirus solution), which could be provided in (or be proximate to) these identified elements, or be provided in any other device, server, network appliance, console, firewall, switch, information technology (IT) device, etc., or be provided as a complementary solution (e.g., in conjunction with a firewall), or provisioned somewhere in the network. As described herein, mobile devices may include any suitable hardware, software, components, modules, interfaces, or objects that facilitate the operations thereof. This may be inclusive of appropriate algorithms and communication protocols that allow for the effective security protection. In addition, the functions described herein can be consolidated in any suitable manner. Along similar design alternatives, any of the illustrated modules and components of the various FIGURES may be combined in various possible configurations: all of which are clearly within the broad scope of this Specification.

Any of these elements can include memory for storing information to be used in achieving the operations as outlined herein. Additionally, the mobile devices may include a processor that can execute software or an algorithm to perform the activities as discussed in this Specification. The mobile devices may further keep information in any suitable memory (random access memory (RAM), ROM, EPROM, EEPROM, ASIC, etc.), software, hardware, or in any other suitable component, device, element, or object where appropriate and based on particular needs. The information being tracked, sent, received, or stored in system 10 could be provided in any database, register, table, cache, queue, control list, or storage structure, based on particular needs and implementations, all of which could be referenced in any suitable timeframe.

Any of the memory items discussed herein should be construed as being encompassed within the broad term 'memory.' Similarly, any of the potential processing elements, modules, and machines described in this Specification should be construed as being encompassed within the broad term 'processor.' Each of the mobile devices, computers, network appliances, etc. can also include suitable interfaces for receiving, transmitting, and/or otherwise communicating data or information in a secure environment.

A processor can execute any type of instructions associated with the data to achieve the operations detailed herein in this Specification. In one example, the processor (as shown in the FIGURES) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In certain example implementations, the functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, memory (as shown in the FIGURES) can store data used for the operations described herein. This includes the memory being able to store software, logic, code, or processor instructions that are executed to carry out the activities described in this Specification.

These elements and/or modules can cooperate with each other in order to perform the activities in connection with profile based filtering of outgoing information as discussed herein. In other embodiments, these features may be provided external to these elements, included in other devices to achieve these intended functionalities, or consolidated in any appropriate manner. For example, some of the processors associated with the various elements may be removed, or otherwise consolidated such that a single processor and a single memory location are responsible for certain activities. In a general sense, the arrangement depicted in FIGURES may be more logical in its representation, whereas a physical architecture may include various permutations, combinations, and/or hybrids of these elements.

In various embodiments, some or all of these elements include software (or reciprocating software) that can coordinate, manage, or otherwise cooperate in order to achieve the operations outlined herein. One or more of these elements may include any suitable algorithms, hardware, software, components, modules, interfaces, or objects that facilitate the operations thereof. In the implementation involving software, such a configuration may be inclusive of logic encoded in one or more tangible media, which may be inclusive of non-transitory media (e.g., embedded logic provided in an application specific integrated circuit (ASIC), digital signal processor (DSP) instructions, software (potentially inclusive of object code and source code) to be executed by a processor, or other similar machine, etc.).

In certain example implementations, the activities outlined herein may be implemented in software. In various embodiments, the software of the system described herein could involve a proprietary element, which could be provided in (or be proximate to) these identified elements, or be provided in any other device, server, network appliance, console, firewall, switch, information technology (IT) device, distributed server, etc., or be provided as a complementary solution, or otherwise provisioned in the network.

Note that with the numerous examples provided herein, interaction may be described in terms of two, three, four, or more network elements and modules. However, this has been done for purposes of clarity and example only. It should be appreciated that the system can be consolidated in any suitable manner. Along similar design alternatives, any of the illustrated modules, components, and elements of FIG. 1 may be combined in various possible configurations, all of which are clearly within the broad scope of this Specification. In certain cases, it may be easier to describe one or more of the functionalities of a given set of flows by only referencing a limited number of elements or components. It should be appreciated that the system of FIG. 1 (and its teachings) is readily scalable and can accommodate a large number of components, as well as more complicated/sophisticated arrangements and configurations. Accordingly, the examples provided should not limit the scope or inhibit the broad teachings of system 10 as potentially applied to a myriad of other architectures.

It is also important to note that the operations described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

What is claimed is:

1. A method comprising:
   detecting, by a service module running on a mobile device, an access request by an application to access information in the mobile device;
   determining, by the service module, if the information being requested by the access request matches a category of information described by at least one policy filter, wherein the category of information being described by at least one policy filter is selected by a user of the mobile device;
   flagging the application as a potential threat in response to determining that the information being requested by the access request matches the category of information being described by the at least one policy filter, wherein the application accesses the information matching the category of information even though the application is flagged;
   in response to flagging the application:
      blocking, by the service module, send requests by the flagged application to send the information matching the category of information from the mobile device without the user's consent;
      placing, by a daemon running on the mobile device, the send requests in a queue with other requests waiting for user intervention; and
   presenting, by the daemon, an outbox comprising the queue having the send requests and the other requests to the user to choose to consent to individual ones of the send requests and the other requests.

2. The method of claim 1, wherein the user selects the category of information through a selection menu on a graphical user interface.

3. The method of claim 2, wherein the selection menu comprises:
   categories of information that are pre-populated by an operating system of the mobile device; and
   entries that can be input by the user, wherein the entries comprise at least one selection from: keywords, selected text, patterns and natural language commands.

4. The method of claim 2, wherein the category of information selected by the user is incorporated into the at least one policy filter.

5. The method of claim 1, wherein the outbox is presented to the user on a graphical user interface, and comprises graphical elements configured to permit the user to selectively consent to any requests in the queue.

6. An apparatus comprising:
   a memory configured to store data; and
   a processor operable to execute instructions associated with the data;
   a service module; and
   a daemon, such that the apparatus is configured for:
      detecting, by the service module, an access request by an application to access information in a mobile device;
      determining, by the service module, if the information being requested by the access request matches a category of information described by at least one policy filter, wherein the category of information being described by at least one policy filter is selected by a user of the mobile device;
      flagging the application as a potential threat in response to determining that the information being requested by the access request matches the category of information being described by the at least one policy filter, wherein the application accesses the information matching the category of information even though the application is flagged;
      in response to flagging the application:
         blocking, by the service module, send requests by the flagged application to send the information matching the category of information from the mobile device without the user's consent;
         placing, by a daemon running on the mobile device, the send requests in a queue with other requests waiting for user intervention; and
      presenting, by the daemon, an outbox comprising the queue having the send requests and the other requests to the user to choose to consent to individual ones of the send requests and the other requests.

7. The apparatus of claim 6, wherein the user selects the information through a selection menu on a graphical user interface, the selection menu comprising:
- information categories that are pre-populated by an operating system of the mobile device; and
- entries that can be input by the user, wherein the entries comprise at least one selection from: keywords, selected text, patterns and natural language commands.

8. The apparatus of claim 6, wherein:
- the service module comprises privileged code implemented as at least one of: (i) a kernel module; (ii) modified existing system services; (iii) new system services; (iv) modified existing libraries; and (v) new libraries; and
- the daemon comprises unprivileged code.

9. A non-transitory computer-readable storage medium comprising logic that when executed on a processor configure the processor to perform operations comprising:
- detecting, by a service module running on a mobile device, an access request by an application to access information in the mobile device;
- determining, by the service module, if the information being requested by the access request matches a category of information described by at least one policy filter, wherein the category of information being described by at least one policy filter is selected by a user of the mobile device;
- flagging the application as a potential threat in response to determining that the information being requested by the access request matches the category of information being described by the at least one policy filter, wherein the application accesses the information matching the category of information even though the application is flagged;
- in response to flagging the application:
    - blocking, by the service module, send requests by the flagged application to send the information matching the category of information from the mobile device without the user's consent;
    - placing, by a daemon running on the mobile device, the send requests in a queue with other requests waiting for user intervention; and
- presenting, by the daemon, an outbox comprising the queue having the send requests and the other requests to the user to choose to consent to individual ones of the send requests and the other requests.

10. The non-transitory computer-readable storage medium of claim 9, wherein:
- a portion of the code comprises privileged code implemented as at least one of: (i) a kernel module; (ii) modified existing system services; (iii) new system services; (iv) modified existing libraries; and (v) new libraries; and
- another portion of the code comprises unprivileged code.

11. The non-transitory computer-readable storage medium of claim 9, wherein the user selects the category of information through a selection menu on a graphical user interface, the selection menu comprising:
- categories of information that are pre-populated by an operating system of the mobile device; and
- entries that can be input by the user, wherein the entries comprise at least one selection from: keywords, selected text, patterns and natural language commands.

12. The non-transitory computer-readable storage medium of claim 11, wherein the category of information selected by the user is incorporated into the at least one policy filter.

13. The non-transitory computer-readable storage medium of claim 9, wherein the outbox is presented to the user on a graphical user interface, and comprises graphical elements configured to permit the user to selectively consent to any requests in the queue.

* * * * *